United States Patent

[11] 3,593,374

| [72] | Inventors | Michel Sierd<br>Saint Adresse;<br>Daniel Pellerin, le Havre, both of, France |
|---|---|---|
| [21] | Appl. No. | 857,500 |
| [22] | Filed | Sept. 12, 1969 |
| [45] | Patented | July 20, 1971 |
| [73] | Assignee | Compagnie Francaise De Raffinage<br>Paris, France |
| [32] | Priority | Feb. 7, 1966 |
| [33] | | France |
| [31] | | PV48,712 |
| | | Continuation-in-part of application Ser. No. 614,356, Feb. 6, 1967, now Patent No. 3,487,501. |

[54] DEVICE FOR BOTTOM-FINISHING BLOW MOLDED HOLLOW PLASTIC ARTICLES
3 Claims, 4 Drawing Figs.

[52] U.S. Cl. .................................................. 18/5 BS,
18/DIG. 18
[51] Int. Cl. .................................................. B29c 23/00
[50] Field of Search........................................... 18/5 BS, 5
BR, 5 BM, 5 BT, 5 BV, 5 BA; 225/83, 100, 102;
264/94, 97, 98, 150, 151, 161, 163

[56] References Cited
UNITED STATES PATENTS

| 2,733,736 | 2/1956 | McLaughlin ................. | 225/102 |
|---|---|---|---|
| 3,040,376 | 6/1962 | Elphee ........................ | 264/161 |

FOREIGN PATENTS

| 737,376 | 6/1966 | Canada ...................... | 18/5 BS |

*Primary Examiner*—J. Spencer Overholser
*Assistant Examiner*—David S. Safran
*Attorney*—Curtis, Morris & Safford ABSTRACT: When hollow plastic articles such as bottles are blow molded in molds having a plurality of seperable parts, an excess "tail" or "flash" is produced, particularly at the bottom of the bottle, by plastic materials beyond the extent of the mold cavity, which excess must be cut off or removed in finishing the articles. Here such flash removal at the bottom of the article is accomplished without hand work and while the article is still in the mold, by pinching the "flash" between a reciprocally movable and a stationary serrated surface and shearing or tearing the excess material away from the article upon movement of one serrated surface with respect to the other.

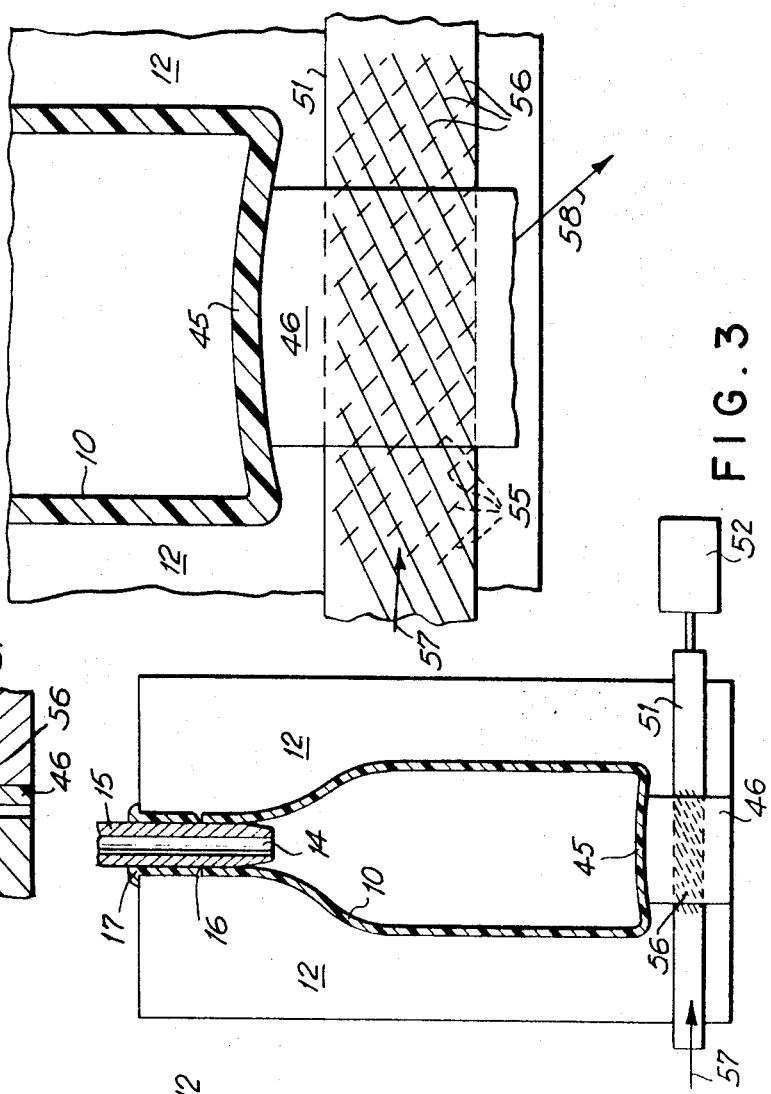
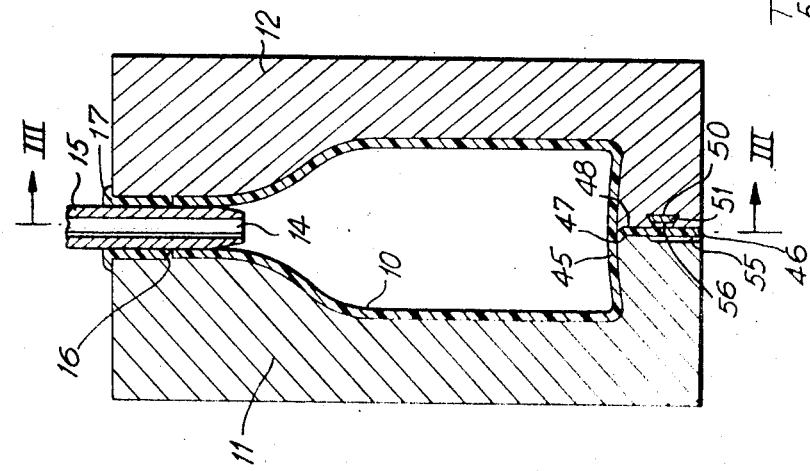

DEVICE FOR BOTTOM-FINISHING BLOW MOLDED HOLLOW PLASTIC ARTICLES

This application is a continuation-in-part of U.S. Pat. application Ser. No. 614,356, filed Feb. 6, 1967, now U.S. Pat. No. 3,487,501.

This invention relates to the blow molding of hollow articles, such as bottles and the like, from synthetic or plastic materials and, more particularly, to the finishing of such articles after blow molding for removal therefrom of the excess "-flash" formed during the molding thereof and especially around the bottom of such articles.

As will be understood, the conventional manufacture by so-called blow-molding techniques of hollow articles (such as bottles or other types of containers, toy and novelty items, machine parts, etc.) from thermoplastic synthetic or plastic materials (such as polyethylene, polystyrene, etc.) generally comprises forming (by injection molding or otherwise) a hollow and relatively thick-walled "preform" or parison of the final article, enclosing the parison of the final article, enclosing the parison in an openable mold defining the desired configuration of the final article while the parison is still hot enough for the plastic material thereof to be soft and flowing, and then blowing the parison with air or other gas introduced thereinto through a mandrel on which the parison was formed or otherwise until it expands to fill and conform to the shape of the mold cavity, after which and upon cooling of the blown article in the mold, the mold is opened and the article removed therefrom.

Considering as illustrative the blow molding of a container shaped like a bottle, there is almost inevitably produced at the bottom of the bottle a "trail" or "flash" of excess plastic—either because some of the plastic was forced out between the bottom parting edges of the mold during blowing or, more generally, because the parison was originally produced as a long intestinelike tube from which each closing blow mold pinched off a length suitable for making one bottle. Similarly, at the open neck of the bottle and around the blowing mandrel there is intentionally left an excess or "flash" of plastic material extending beyond what is intended to be the finished bottle top or neck. A novel apparatus for the removal of the "flash" from the neck portion of the article is described in the copending U.S. application now U.S. Pat. No. 3,487,501.

After the blow molding is completed, such bottom "tails" or "flash" (which term shall be used herein as meaning the excess portion which must be severed from the bottom of the article after molding) must be removed to produce a suitable and finished article. Because of the economics of this industry today, virtually all such blow molded hollow articles are mass produced in highly automated machinery, and the cost margins involved do not admit of hand finishing or manually removing the flash excess portions. Indeed, it may even be considered undesirable from a cost standpoint merely to provide an additional operating stage, however automated, for removing such excess flash from the individual articles after these are removed from the molds, and especially because of the difficulty of maintaining a large plurality of such articles in any particular orientation in view of the extremely light weight thereof compared to the size of the articles.

If it were attempted to provide in or at the blow mold itself means such as a moving serrated surface for chewing or tearing away such excess flash material, difficulty may be experienced in avoiding deposition or buildup of the softened plastic material in the serrated chewing surfaces and/or in providing synchronized means for cleaning such surfaces and/or, more importantly, the substantial difficulties and complications incident to integrating into complicated automated machinery additional synchronized movements of trimming or tearing apparatus correctly cycled with the movements of opening and closing the mold, introducing and withdrawing the blowing mandrel, etc.

According to this invention, however, apparatus and methods are provided for removing such excess flash from the bottom of blow molded plastic articles while the articles are still in the mold, in order to avoid a separate or additional manual or mechanical finishing operation, and in a manner to which existing machinery can be readily adapted without complex change or redesigning, by generally providing opposed stationary and movable surfaces (such as opposed moving and stationary pinching surfaces at the bottom) having serrations thereon and arranged so that the flash is pinched or held between the serrated surfaces and sheared away in the finishing step by moving the movable serrated surface with respect to the stationary one. As a further feature of this invention, the particular orientation and configuration of the serrations of such finishing surfaces are arranged, with regard to the particular type of article being molded and the particular molding apparatus used, so as to remove or eject the bottom flash downwardly from the article at a desired angle so that this finishing operation does not interfere with the normal cycling of the molding machinery nor the manner of removing the finished article from the mold virtually regardless of which of the several different but conventional blow mold apparatus designs is being considered.

With the foregoing and additional objects in view, this invention will now be more particularly described, and other objects and advantages thereof will be apparent from the following description, the accompanying drawings, and the appended claims.

In the drawings:

FIG. 1 is a somewhat diagrammatic view in axial section of a blow mold for blowing a bottle-shaped container embodying and for practicing this invention and illustrating the removal of the bottom flash or "tail" from the molded article, with a blow mold being shown closed during the blowing of the article;

FIG. 2 is a partial view on a larger scale of the flash-removing mechanism illustrated at the bottom of FIG. 1;

FIG. 3 is a somewhat diagrammatic axial section of the arrangement of FIG. 1 and taken on the line III-III thereof; and FIG. 4 is a diagrammatic view on a larger scale but in the same plane as FIG. 3, illustrating particularly a preferred orientation and configuration of the serrations on stationary and moving surfaces embodying and for practicing this invention in the removal of the bottom flash or "tail" from the blown article.

Although, as will be understood, this invention is readily applicable to a wide variety of blow-molded plastic articles, it will be convenient to describe the invention, merely as illustrative, in connection with blow-molded plastic bottles or jugs or similarly shaped containers, especially since such articles probably comprise the largest quantity of blow-molded hollow articles produced today. As noted above, the economics of the industry virtually demand the utilization of one or another of conventional varieties of highly automated mass production machinery.

The normal operation of such machinery in its intended manner produces the excess flash which must be removed in one way or another from both bottom and top or neck of the blown bottle. Obviously, it is undesired that this should be a manual operation with each of thousands of bottles, but it may also be undesirable for the removal of such flash to necessitate a separate mechanical operation, however much automated, and particularly when, as here, it is desired to accomplish the flash removal with apparatus of great simplicity which can be incorporated in various different existing machines or molding devices.

In accordance with this invention and that described in the copending application Ser. No. 611,356 and now U.S. Pat. No. 3,487,501, for example, the flash removal from the neck of the bottle as illustrated in said application is accomplished by cooperation between the blowing mandrel and the mold cavity surfaces without the interposition of additional moving parts or extra automatic operations because the blowing mandrel and mold cavity surfaces and relative movement thereof are necessary in any event. The utilization of this device in accordance with the device provided herein for bottom flash separation provides a distinct advantage over any additional mechanical or manual operation on the molded article after removal from the mold.

That is, the mandrel, in most machine designs, is movable in any event, so that a simplicity of manufacture is achieved by utilizing it in accordance herewith for the removal of the flash at the bottom of the bottle. Even in specialized situations the ancillary mechanism is readily applied to existing machines without interrupting or changing the normal cycle of operation of the opening and closing of the molds.

Thus, regarding the flash at the bottom of the bottle, the removal thereof in accordance herewith is accomplished by the incorporation of but a single moving part into the standard blow mold apparatus. Also, regarding the bottom flash, the removal thereof is accomplished in accordance herewith in a manner which directs the ejected or removed flash as may be desired and so as not to interfere with whatever automated conveyor or other equipment is normally utilized to accept and handle the finished bottles after the opening of the blow mold.

Generally, in accordance herewith, when the mold closes on the parison (or that part of the parison which will produce the flash to be removed), it is gripped between pinching pressure surfaces of the mold at he bottom thereof. By providing such surfaces with serrations to bite into the flash-producing portion of the plastic material from the mold and arranging, after solidification and cooling of the blown article, to move one of those serrated surfaces with respect to the other, the flash is sheared off at the conventional mold cutting edges at the bottom thereof, and in a manner which can readily be applied to almost any of the wide variety of blow molds and blow molding apparatus now in use. By arranging the orientation of the opposed serrations with respect to the axis and direction and movement (and preferably in a manner where the serrations on one surface are differently orientated than those on the opposed surface), not only is the desired shearing or tearing action provided for removal of the flash, but also the direction of ejection of the removed flash is suitably controlled to avoid interfering with other portions of the apparatus and/or subsequent automatic conveying or handling equipment.

Referring to the drawings, which illustrate somewhat diagrammatically preferred embodiments of apparatus for practicing this invention as automated blow molding apparatus for producing a plastic bottle and in which like characters of reference refer to like parts throughout the several views thereof, there is illustrated in FIG. 1 a hollow body in the form of a bottle 10 being blow molded in the mold cavity formed by half-molds 11 and 12 which are separable in known manner and by conventional arrangements not shown here. For simplicity, only the bottom portion of the mold parts 11 and 12 and the molded article 10 are shown as illustrating the removal of flash from the bottom being also further described in more detail below in connection with FIGS. 2 to 4.

At the time illustrated in FIG. 1, the original parison has been substantially completely blown to form article 10 (all in known manner) by passing compressed air through passage 14 in a mandrel 15 inserted into the mouth of the mold and the parison. The desired finished top of molded article 10 is defined by cutting edges 16 formed in the mold cavity, and the flash desired to be removed hereby is that portion 17 of the plastic material above and beyond cutting edges 16, which portion was originally trapped or pinched between the closing mold parts 11 and 12 and mandrel 15. As also will be apparent, satisfactory results are achieved in accordance herewith in both the blow molding of relatively small bottles from relatively small parisons and the blow molding of substantially larger containers from thick-walled parisons or larger containers having substantially thinner walls.

Examining more particularly the device employed for removal of the "tail" or flash produced when making a bottle or other hollow article by closing mold parts 11 and 12 on the tail end of the parison or otherwise, in FIG. 1 here is shown a "tail" or flash 46 at the bottom 45 of bottle 10 and the mold cavity formed between mold halves 11 and 12. This flash 46 is pinched or held between opposed pinching surfaces 47 and 48 of mold parts 11 and 12. In a groove 50 formed in mold part 12, there is provided a sliding bar 51 for transverse back-and-forth sliding movements under the control of a feed screw or other conventional driving device indicated generally at 52. Serrations 55 are provided on a portion of stationary pinching surface 47 on mold part 11, while corresponding serrations 56 are provided on the opposed face of sliding bar 51.

Thus, as will be apparent from the foregoing, when mold parts 11 and 12 close upon an end portion of the original parison, bottom flash or "tail" 46 is formed. After the blowing of the parison into the form of article 10 contained in the mold is completed and the finished article cooled (which may require, in known manner and with conventional apparatus, cooling of the mold, including the bottom portion thereof) and just a moment prior to the time when the mold is opened to release the finished article 10, sliding bar 51, under the action of its drive mechanism 52, is moved laterally in the direction of arrow 57 (FIGS. 3 and 4) so that serrations 56 on sliding bar 51 and biting into flash 46, tear or shear off the flash at the meeting point of pressure surfaces 47—48 of mold parts 11—12.

In this matter, the bottom flash 46 is sheared or torn from the finished article 10 while still in the mold but without interrupting the normal cycling of the apparatus, and this is accomplished by changing the conventional mold with no more than the addition thereto of a slot or groove 50 in which may operate sliding bar 51 with the serrations 56 thereon. As will be understood, the extent of oblique angle of serrations 56 (and that of serrations 55 on the stationary surface 47 of mold part 11) is primarily indicated by the particular plastic material being utilized and, of course, the thickness and tenacity of flash 46. Preferably, the serrations 56 on sliding bar 51 are at a relatively oblique angle (as indicated purely diagrammatically by the lines in FIGS. 3 and 4), whereas the serrations 55 on stationary surface 47 of mold part 11 may be either parallel to the axis of sliding bar 51 or oblique in a contrary direction, as indicated by the dotted lines in FIG. 4, in which event the sheared-off flash 46 will normally drop at an angle in the direction of arrow 58 in FIG. 4, thus to miss becoming entangled with ancillary conveying or other portions of the apparatus, as may be desired.

As will be understood, the particular dimensions of the moving and stationary serrations 56 and 55, as well as the respective or opposed angles thereof, are primarily dictated by the nature of the plastic material being treated and the size of flash 46, and completely within the skill of the art without further experimentation. It is to be understood, however, that such serrations should be selected to avoid an excessive power requirement for the movement of sliding bar 51 and shearing of flash 46, as well as regarding the direction in which it is desired to have sheared flash 46 drop away from mold parts 11 and 12 to avoid becoming entangled in other portions of the apparatus. A sawtooth configuration is preferred for serrations 55 and 56 so that these may obtain a good "bite" into the softened plastic material initially pressed between these.

Accordingly, as will be apparent from the foregoing, there are provided herewith techniques and apparatus for removing the excess flash from bottom end thereof, and in a manner which requires substantially little or no additional apparatus added to any of a variety of conventional blow molding machines and which does not intrude into the normal synchronizing cycling movements of the mandrel and mold parts. For the bottom flash, the only necessary moving part in accordance herewith is the one sliding bar operating in a cavity in one mold part, with the particular cooperating orientation of serrations accomplishing the desired result. Operations in accordance with this invention satisfactorily remove the excess flash as desired, and completely while the blown article is still in the mold, without requiring either handwork or an additional mechanical operation or station as conventional hitherto, and without requiring complex or expensive redesigning of existing types of blow molding machines.

While the methods and apparatus described herein form preferred embodiments of this invention, this invention is not limited to these precise methods and apparatus, and changes may be made therein without departing from the scope of this invention.

What we claim is:

1. An apparatus particularly adapted to remove excess flash from the end of a blown hollow article opposite to that in which a blowing mandrel is inserted and which comprises separable mold parts, stationary serrated surfaces on at least one of the separable mold parts beyond the area defining said finished article and in opposed relation to a surface on another of said mold parts for pinching said excess flash therebetween, a reciprocal slide in said opposed mold part, said slide having sawtooth serrations thereon inclined at an angle to the axis thereof, and means for reciprocating said slide for shearing and tearing said excess flash from said hollow article at said cutting edges of said mold parts.

2. Apparatus as recited in claim 1 in which said serrations on said reciprocal slide are disposed at an angle to the axis thereof and at an angle to said serrations on said stationary surface of said other mold part.

3. Apparatus as recited in claim 2 in which said serrations on said stationary mold part are disposed at an angle to the axis of said reciprocal slide and opposite to the angle between said serrations on said slide and said axis thereof.